April 20, 1926.

W. E. HART

PISTON RING TOOL

Filed Sept. 8, 1925

1,582,011

Inventor

W. E. Hart

By Lacy & Lacy, Attorneys

Patented Apr. 20, 1926.

1,582,011

UNITED STATES PATENT OFFICE.

WILLIAM E. HART, OF WOODSTOCK, ILLINOIS.

PISTON-RING TOOL.

Application filed September 8, 1925. Serial No. 55,137.

*To all whom it may concern:*

Be it known that I, WILLIAM E. HART, a citizen of the United States, residing at Woodstock, in the county of McHenry and State of Illinois, have invented certain new and useful Improvements in Piston-Ring Tools, of which the following is a specification.

This invention relates to a device which may be termed a piston ring placing and removing tool and through the use of which a piston ring may be readily expanded and either put in place upon a piston or removed therefrom.

One object of the invention is to so construct the same that when in use a piston ring may be firmly gripped adjacent its ends and spread without the device being liable to slip along the piston ring or permit the ring to slip and return to its normally contracted position while being held.

Another object of the invention is to provide the device with an improved type of ring engaging yoke so formed and mounted upon the body portion of the tool that the yoke may be readily slipped into engagement with a piston ring carried by a piston.

Another object of the invention is to so form the head of the tool that a tooth portion intended to bite into the outer face of the pison ring may be readily kept sharp.

This invention is illustrated in the accompanying drawing, wherein—

Figure 1:
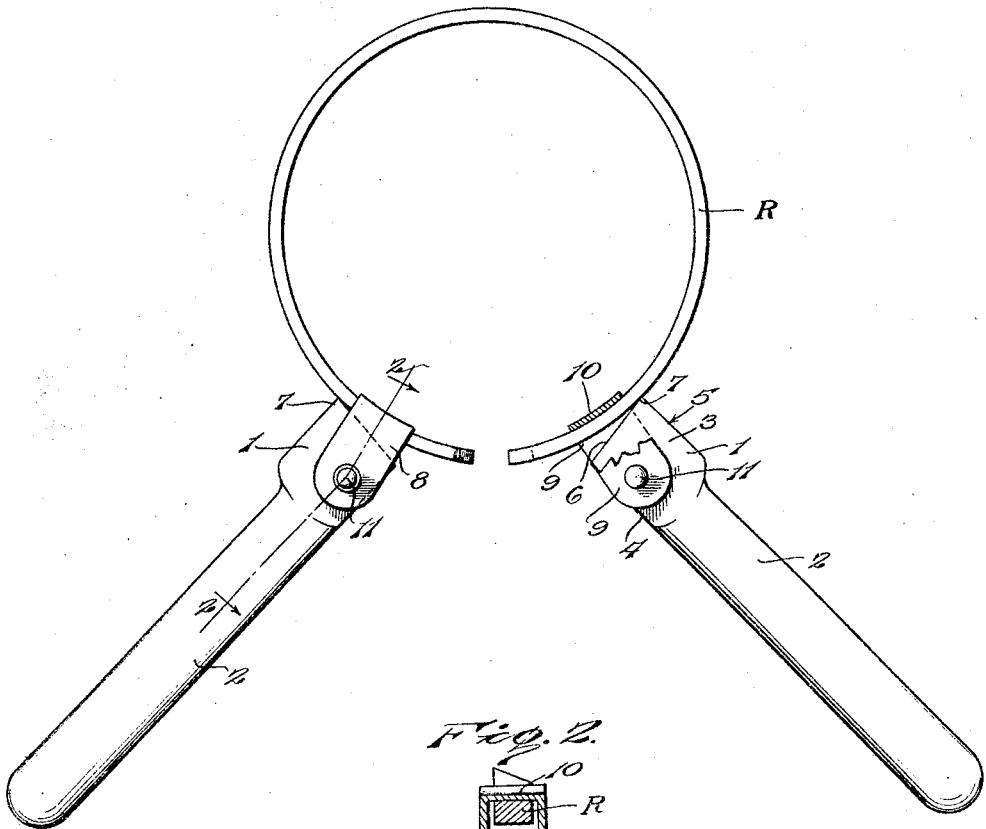
Figure 2:
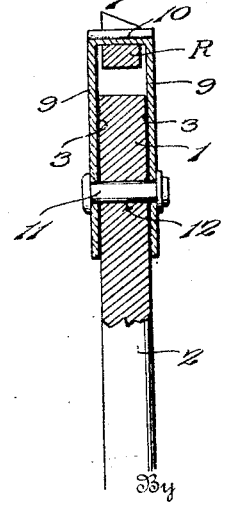

Figure 1 is a view in top plan showing a piston ring engaged by a pair of the improved tools and held in a spread condition, and Fig. 2 is a sectional view taken on the line 2—2 of Fig. 1.

In order to mount a piston ring upon a piston or remove it, it is necessary to spread the ring and, therefore, when in use two of the devices will be employed and engaged with the end portions of the ring, as shown in Fig. 1. These tools are of the same construction and, therefore, only one will be described in detail. The body portion of the tool is formed as a one-piece structure and includes a head 1 from which extends a handle 2. The body is preferably formed of steel but it will be understood that any suitable material may be used which is of sufficient hardness to firmly grip the ring. The head 1 is rectangular in cross section to provide flat faces 3 and edge faces 4 and 5, the faces 5 however, being of greater length than the face 4 so that the end face 6 of the head is disposed at an incline, as shown in Fig. 1, and at its intersection with the face 5 forms a tooth 7 adapted to bite into the outer face of the piston ring R when the tool is in use.

The tool is held in operative engagement with the piston ring by means of a yoke indicated in general by the numeral 8. This yoke is preferably formed from a strip of strong sheet metal bent intermediate its length to provide arms 9 joined by a bridge portion 10, the bridge portion being curved so that it conforms to the curvature of the piston ring and may have flat contacting engagement with the inner face of the ring. The yoke is disposed in straddling relation to the head 1 with its arms 9 extending along the side faces 3 of the head and formed with openings to receive the end portions of a pivot pin 11. The pin 11 extends through an opening 12 formed in the head and when riveted at its ends, as shown in Fig. 2, serves to firmly hold the yoke in place but permit it to have the necessary tilting movement.

When a piston ring is to be put in place upon a piston, its end portions are passed through the yokes of a pair of the improved tools and the two tools then grasped by their handles. The handles are swung away from each other so that the tooth forming corners 7 of their heads are brought into engagement with the outer face of the ring and the bridge portions 10 of the yokes drawn into close contacting engagement with the inner face of the ring. Additional pressure is then exerted and the ends of the ring will be forced apart to substantially the position shown in Fig. 1. When so spread the ring can be very easily placed upon the piston and when in place the pressure upon the handles will be relieved so that they may swing towards each other and move the heads out of biting engagement with the ring. The yokes may now be readily slipped out of engagement with the end portions of the ring and leave the ring in place upon the piston. When it is desired to remove a ring from a piston, a similar operation takes place and the end portions of the ring forced apart a sufficient distance to expand the ring and permit of its being readily removed from the piston. By having the bridge portions of the yokes curved, as shown, they are not only permitted to have close contacting engagement with the inner face of the ring but in addition are permitted of being very easily slipped into engagement with the ends of a ring mounted upon a piston.

Having thus described the invention, I claim:

1. A piston ring tool comprising an elongated body constituting a handle and having a head at one end formed with edge faces and an end face disposed at an incline and at its intersection with one of the edge faces forming a tooth, and a U-shaped yoke straddling said head with its arms pivotally mounted at opposite sides thereof and its bridge portion spaced from the inclined end face of the head.

2. A piston ring tool comprising an elongated body constituting a handle and having a head at one end formed with edge faces and an end face disposed at an incline and at its intersection with one of the edge faces forming a tooth, and a U-shaped yoke straddling said head with its bridge portion spaced from the inclined end face of the head and its arms extending along opposite sides of the head and pivotally mounted in offset relation to the transverse center of the head.

3. A piston ring tool comprising an elongated body constituting a handle and having a head at one end formed with edge faces and an end face disposed at an incline and at its intersection with one of the edge faces forming a tooth, a U-shaped yoke straddling said head with its bridge portion spaced from the inclined end face of the head and its arms extending along opposite sides of the head, and a pin extending through said head and arms in offset relation to the transverse center of the head and pivotally mounting the yoke for swinging towards and away from said tooth.

4. A piston ring tool comprising an elongated body constituting a handle and having a head at one end formed with edge faces and an end face disposed at an incline and at its intersection with one of the edge faces forming a tooth, a U-shaped yoke straddling said head with its bridge portion spaced from the inclined end face of the head and its arms extending along opposite sides of the head, and a pin extending through said head and arms in offset relation to the transverse center of the head and pivotally mounting the yoke for swinging towards and away from said tooth, the bridge of said yoke being curved to conform to the curvature of a piston ring fitted between the yoke and end face of said head.

5. A piston ring tool comprising a handle, a head at one end of said handle and formed with edge faces and an end face disposed at an incline and at its intersection with one edge face forming a tooth, and a yoke pivotally connected with said head and having a portion extending across the inclined end face of the head in spaced relation thereto for cooperating with said tooth when gripping a piston ring.

6. A piston ring tool comprising a handle, a head at one end of said handle and formed with edge faces and an end face disposed at an incline and at its intersection with one edge face forming a tooth, and a yoke straddling said head and having a bridge portion extending across the end face of the head in spaced relation thereto for cooperating with said tooth when gripping a piston ring, and arms extending from the bridge portion along opposite sides of the head, one arm being pivotally connected with the head.

In testimony whereof I affix my signature.

WILLIAM E. HART. [L. S.]